US012786304B2

(12) United States Patent
Weston et al.

(10) Patent No.: US 12,786,304 B2
(45) Date of Patent: Nov. 3, 2026

(54) SYSTEMS AND METHODS FOR HANDS-FREE COMMUNICATION IN CONVERTIBLE VEHICLES

(71) Applicant: Ford Global Technologies, LLC, Dearborn, MI (US)

(72) Inventors: Keith Weston, Canton, MI (US); John Robert Van Wiemeersch, Novi, MI (US); Matthew Flis, Northville, MI (US); Brendan Diamond, Naples, FL (US)

( * ) Notice: Subject to any disclaimer, the term of this patent is extended or adjusted under 35 U.S.C. 154(b) by 203 days.

(21) Appl. No.: 18/903,253

(22) Filed: Oct. 1, 2024

(65) Prior Publication Data

US 2026/0095520 A1 Apr. 2, 2026

(51) Int. Cl.

| | |
|---|---|
| ***H04M 1/60*** | (2006.01) |
| ***B60K 35/10*** | (2024.01) |
| ***B60K 35/28*** | (2024.01) |
| ***G06F 3/01*** | (2006.01) |
| ***G10L 15/25*** | (2013.01) |
| ***H04W 4/40*** | (2018.01) |

(52) U.S. Cl.

CPC ........... *H04M 1/6083* (2013.01); *B60K 35/10* (2024.01); *B60K 35/28* (2024.01); *G06F 3/017* (2013.01); *G10L 15/25* (2013.01); *H04W 4/40* (2018.02); *B60K 2360/172* (2024.01)

(58) Field of Classification Search

CPC ...... G06F 3/017; H04M 1/6083; B60K 35/10; B60K 35/28; B60K 2360/172

See application file for complete search history.

(56) References Cited

U.S. PATENT DOCUMENTS

| | | | | |
|---|---|---|---|---|
| 8,031,879 B2 * | 10/2011 | Eid | .......................... | H03G 3/32 381/20 |
| 9,071,892 B2 * | 6/2015 | Gratke | ..................... | H04R 3/00 |

(Continued)

FOREIGN PATENT DOCUMENTS

| | | | | |
|---|---|---|---|---|
| CN | 107078706 A * | 8/2017 | ........... | H03G 3/3005 |
| DE | 102015120803 A1 | 6/2016 | | |
| DE | 102019122541 A1 * | 2/2020 | ............ | B60W 10/06 |

OTHER PUBLICATIONS

Palmer Dodge Chrysler Jeep Ram, 2024 Jeep Wrangler, https://www.palmerdodgegeorgia.com/2024-jeep-wrangler.htm, 2024, pp. 1-9.

*Primary Examiner* — Patrick F Marinelli
(74) *Attorney, Agent, or Firm* — Frank Lollo; Eversheds Sutherland (US) LLP

(57) ABSTRACT

A vehicle that can mitigate the effects of high ambient noise level is provided. The vehicle can determine using image data and/or other sensor data that the vehicle is in a convertible state. The vehicle further determines that an ambient noise level in the vehicle is higher than a threshold. The vehicle then switches the mode of operation in order to clearly receive audio input and interpret the audio input. The vehicle may enable a lip reading mode and/or a gesture and facial expression detection mode in order to determine words spoken by a user of the vehicle. The vehicle may further store association information between a gesture and a corresponding verbal command associated with the vehicle. In high ambient noise environments, the vehicle may suggest using the gestures/facial expressions instead of verbal commands.

18 Claims, 6 Drawing Sheets

(56) References Cited

U.S. PATENT DOCUMENTS

| | | | | |
|---|---|---|---|---|
| 10,448,180 | B1 * | 10/2019 | Helm | B60K 35/22 |
| 2004/0142672 | A1 * | 7/2004 | Stankewitz | H04M 1/19 455/296 |
| 2013/0304475 | A1 * | 11/2013 | Gratke | H04R 3/00 381/86 |
| 2021/0181834 | A1 | 6/2021 | Yamamoto et al. | |
| 2026/0095520 | A1 * | 4/2026 | Weston | B60K 35/10 |

* cited by examiner

SYSTEMS AND METHODS FOR HANDS-FREE COMMUNICATION IN CONVERTIBLE VEHICLES

FIELD

The present disclosure relates to the field of vehicle communication. More specifically, embodiments of the present disclosure related to use of hands-free communication systems in convertible vehicles or vehicles having an open top or the like.

BACKGROUND

Audible communication in an open-top or convertible vehicle can be challenging due to increased ambient noise. When the top is down, doors are removed, or the windows are opened, the sound of the wind, traffic, and other environmental noises can affect conversations.

Another issue is the influence of speed on sound transmission in an open-top or convertible vehicle. As the vehicle's speed increases, the wind noise becomes more pronounced, further affecting communication. This is particularly an issue on highways or during high-speed driving, where the noise levels can increase. Moreover, the open environment can cause sound to dissipate more quickly, reducing the effectiveness of verbal communication.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes systems and methods for mitigating effects of high ambient noise levels in convertible or open-top vehicles.

In some instances, a vehicle is provided that includes one or more sensors, one or more processors coupled to the one or more sensors, and a communication system coupled to the one or more processors. The one or more processors receive sensor data from the one or more sensors, determine, based on the sensor data, that the vehicle is in a convertible state, determine a level of ambient noise in the vehicle, determine that the level of ambient noise is greater than a threshold, and configure the communication system to operate in an enhanced mode.

In another instance, a method performed by a vehicle is disclosed. The method includes the vehicle determining using one or more sensors of the vehicle that the vehicle is in a convertible state. The method further includes the vehicle determining using the one or more sensors an ambient noise level in the vehicle and that the ambient noise level is greater than a threshold. The method further includes the vehicle switching a communication system of the vehicle from a first mode of operation to a second mode of operation.

In yet another instance, a method performed by a vehicle is disclosed. The method includes storing, by the vehicle in a database, association information between each of a plurality of gestures and a corresponding verbal command associated with the vehicle, determining, by the vehicle, that the vehicle is in a convertible state, determining, by the vehicle, that the ambient noise level in the vehicle is higher than a threshold, instructing, by the vehicle to a user of the vehicle, based on the vehicle being in the convertible state and the ambient noise level being higher than the threshold, to use gestures instead of verbal commands to interact with the vehicle.

These and other advantages of the present disclosure are provided in detail herein.

Illustrative Embodiments

The disclosure will be described more fully hereinafter with reference to the accompanying drawings, in which example embodiments of the disclosure are shown, and are not intended to be limiting.

Figure 1:
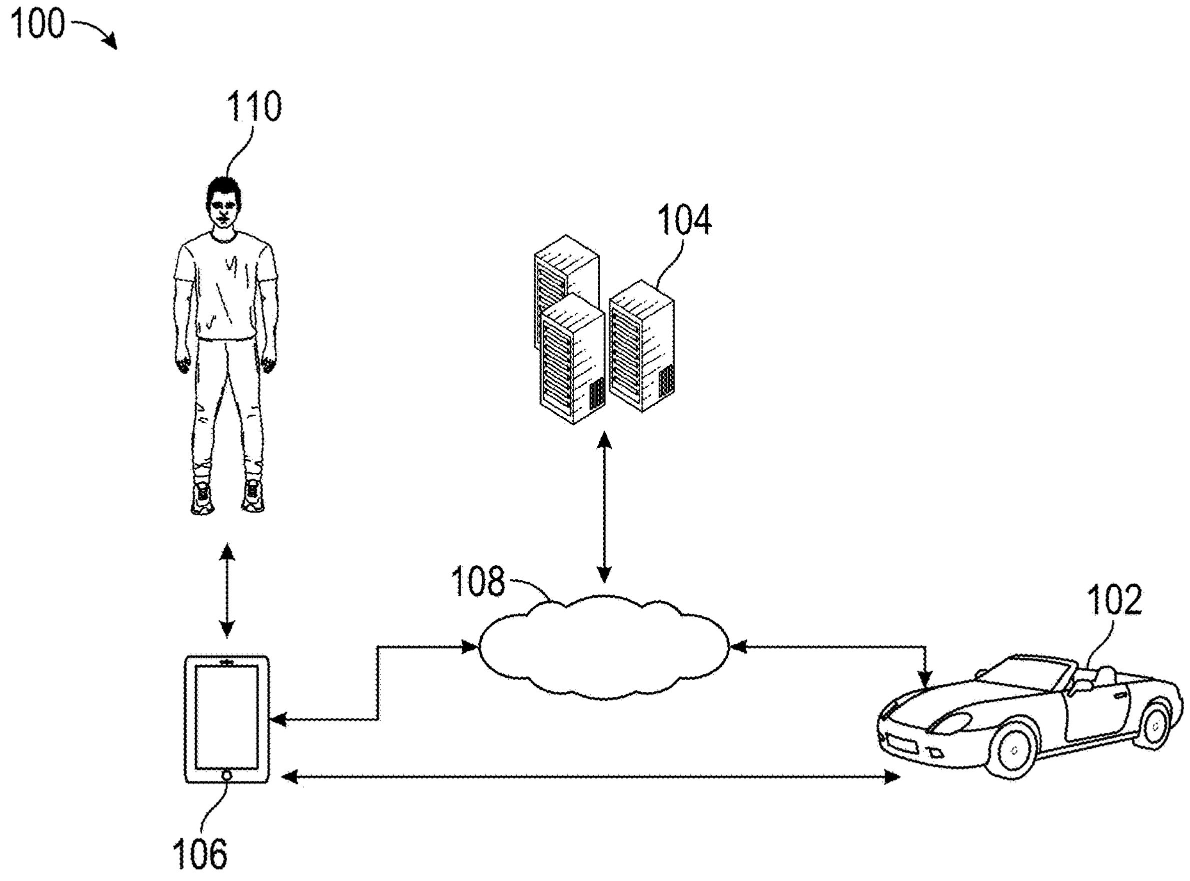
FIG. 1 illustrates an environment in which the embodiments of the present disclosure may be implemented.

FIG. 1 illustrates an environment 100 in which the various embodiments of the present invention may be implemented. The environment 100 may include a vehicle 102, a user device 106, and one or more control servers 104. The control servers 104, the vehicle 102, and the user device 106 may be communicatively coupled to each other via one or more networks 108. The user device 106 may be associated with a user 110 of the vehicle 102, and may be, for example, a mobile phone, a laptop, a computer, a tablet, a smartwatch, a wearable device, or any other device with communication capabilities.

The control server 104 may be part of a cloud-based computing infrastructure and may be associated with and/or include a Telematics Service Delivery Network (SDN) that provides digital data services to the vehicle 102. In additional aspects, the control server 104 may be an assistance server and may be associated with at least one of a tow assistance firm, a vehicle maintenance and repair firm, an insurance firm, and a transportation firm. Details of the control server 104 are provided below with reference to FIG. 7.

The network 108 illustrates an example communication infrastructure in which the connected devices discussed in various embodiments of this disclosure may communicate. The network 108 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer, a Vehicle Control Unit (VCU), and a detection unit. Details of the vehicle are provided below in reference to FIG. 2.

Figure 2:
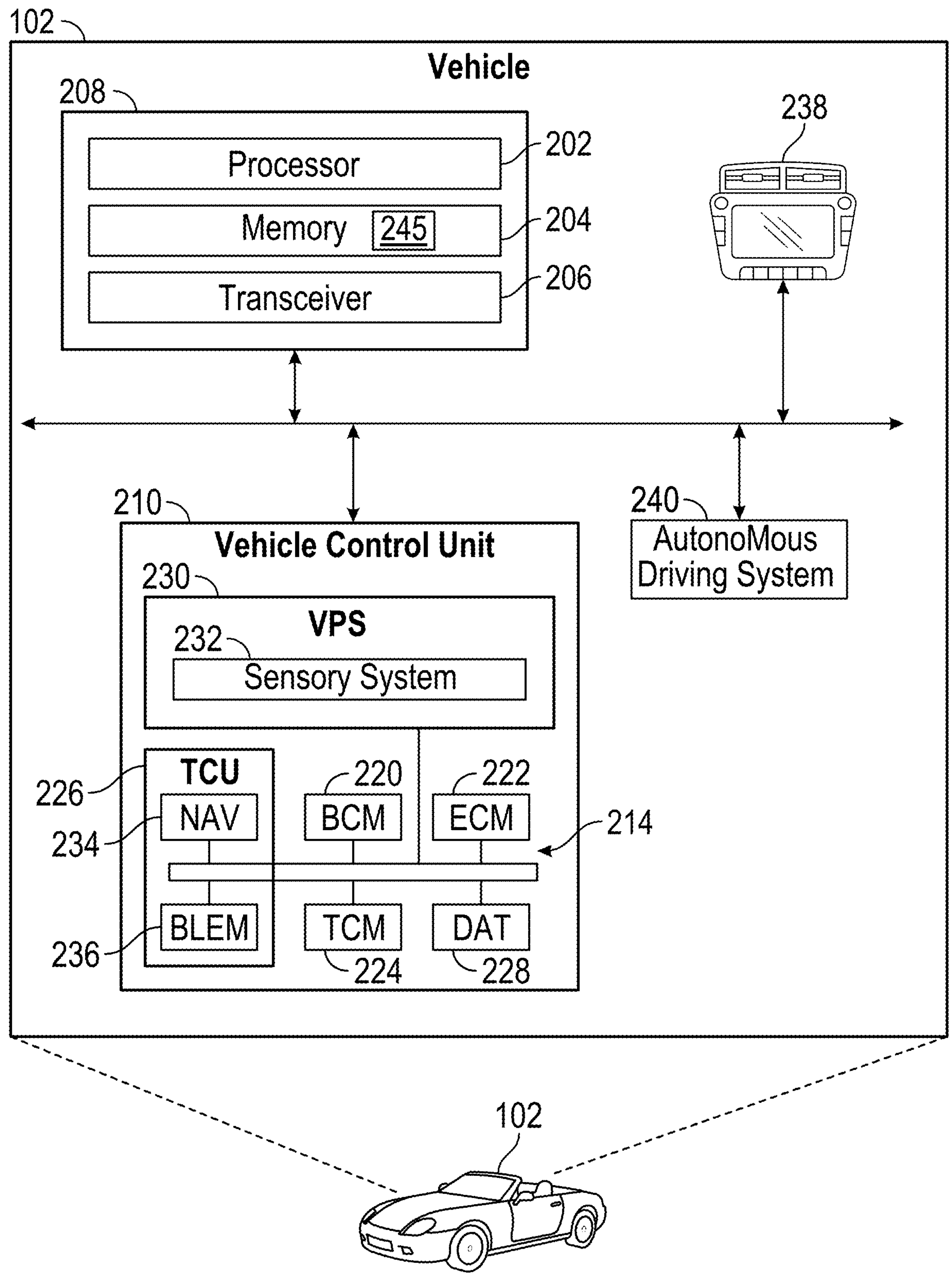
FIG. 2 illustrates a block diagram of a vehicle according to an embodiment of the present disclosure.

FIG. 2 illustrates a block diagram of a vehicle 102 in which embodiment of the present disclosure can be implemented. The vehicle 102 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, or the like may be configured to connect with the automotive computer 208, which may communicate via one or more wireless connection(s), and/or may connect with the vehicle 102 directly by using near field communication (NFC) protocols, Bluetooth® protocols, Wi-Fi, Ultra-Wideband (UWB), and other possible data connection and sharing techniques.

The automotive computer 208 may be installed anywhere in the vehicle 102, in accordance with the disclosure. The automotive computer 208 may be or include an electronic vehicle controller, having one or more processor(s) 202, one or more memories 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems (e.g., a user device 208, an external server, and/or the like). Further, the transceiver 206 may transmit notifications, requests, signals, etc. to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power bus with the automotive computer 208 and may be configured and/or programmed to coordinate the data between vehicle systems, connected servers and/or the like. The VCU 210 may include or communicate with any combination of the ECUs 214, such as, for example, a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 102 at one or more locations and in one or more manner. For example, the various sensors of the vehicle sensory system 232 may be integrated into the various subsystems of the vehicle 102, such as doors, mirrors, top, etc. or attached to the vehicle 102 using an appropriate mounting mechanism. In some embodiments, the various sensors of the vehicle sensory system 232 may be located at the front, back, sides, top, bottom, and underneath the vehicle 102. The location of a sensor may depend on its function. For example, a sensor that monitors the area underneath the vehicle may be connected to a bottom surface of the vehicle 102 while a sensor that can monitor an area to either side of the vehicle 102 may be mounted or integrated into the doors of the vehicle 102. Vehicle sensory system 232 may also include one or more road noise sensors such as accelerometers that are coupled to various mechanical components and/or systems of the vehicle 102. One skilled in the art will realize that the sensors may be coupled to the vehicles in various different ways and locations other than the ones mentioned above.

In some embodiments, the VCU 210 may control vehicle operational aspects and implement one or more instruction sets received from the server 206, the user device 208, or from one or more instruction sets stored in the memory 204.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), an external server, a user device, etc.), computers, and modules. The TCU 226 may be in communication with the ECUs 214 by way of a bus. In some aspects, the TCU 226 may be configured to determine a real-time vehicle geolocation (e.g., via the NAV receiver 234).

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In some embodiments, vehicle 102 may include an autonomous driving system 240. Vehicle 102 may be manually driven or configured to operate, using the autonomous driving system 240, in a fully autonomous (e.g., driverless) mode (e.g., Level-5 autonomy) or in one or more partial autonomous modes which may include driver assist technologies. In some embodiments, the DAT controller 228 may be part of the autonomous driving system 240. Examples of partial autonomous (or driver assist) modes are widely understood in the art as autonomy Levels 1 through 4. For example, a vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver who performs non-automated operations such as braking and other controls. In some embodiments, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as passing a slow-moving vehicle, while the present driver remains ready to retake control of the vehicle if the system is unable to execute the task.

Level-4 AVs can operate independently from a human driver but may still include human controls for override operation. Level-4 automation may also enable a self-driving mode to intervene responsive to a predefined conditional trigger, such as a road obstacle or a system event.

Level-5 AVs may include fully autonomous vehicle systems that require no human input for operation and may not include human operational driving controls.

Convertible or open-top, door removed, vehicles are normally associated with high level of ambient noise. The effect of ambient noise is more pronounced when driving at higher speeds (e.g., >50 mph). At higher speeds, the ambient noise generated by the flowing air, the road, other vehicles in the vicinity, and other sound sources may be high enough so as to interrupt with the normal operation of the communication system of the vehicle. For example, if the user of the vehicle is having a phone conversation using the hands-free mode of the vehicle, the user may have difficulty understanding what the other person is saying. Also, the other person in the conversation may have difficulty in understanding what the user is saying. In the instance where the user is providing a verbal instruction or command to the vehicle (e.g., interacting with the navigation system to ask for directions, change the climate settings, etc.), the ambient noise may interfere with the vehicle's ability to "hear" and interpret the verbal instruction, resulting in abnormal operation of the corresponding feature.

When the ambient noise level within the vehicle is high, it may saturate the microphones of the vehicle and/or the user device to an extent where the microphones are not able to detect the words being spoken. If the microphones are not able to receive clear audio, the associated speech recognition system will not be able to discern the words spoken and hence won't be able to understand the given instruction. Embodiments of the present disclosure provide systems and methods to alleviate these and other issues that arise due to high level of ambient noise in a vehicle. Although the embodiments are described in the context of convertible vehicles, it is to be understood that the systems and methods disclosed herein are applicable to any vehicle with high ambient noise levels inside the passenger cabin.

For the purposes of the present disclosure a "convertible" vehicle includes vehicles with a retractable top, vehicles with one or more removable top panels, vehicles with one or more removable doors, vehicles having a sunroof or a moon roof, and the like. Further, a vehicle being in a "convertible state" means a vehicle that has its top partially or fully retracted, or a vehicle with one or more of its doors removed, or a vehicle with a partially or fully opened sunroof, or a vehicle with one or more of its top panels removed, or vehicles having a high ambient noise levels in the passenger cabin.

Figure 3:
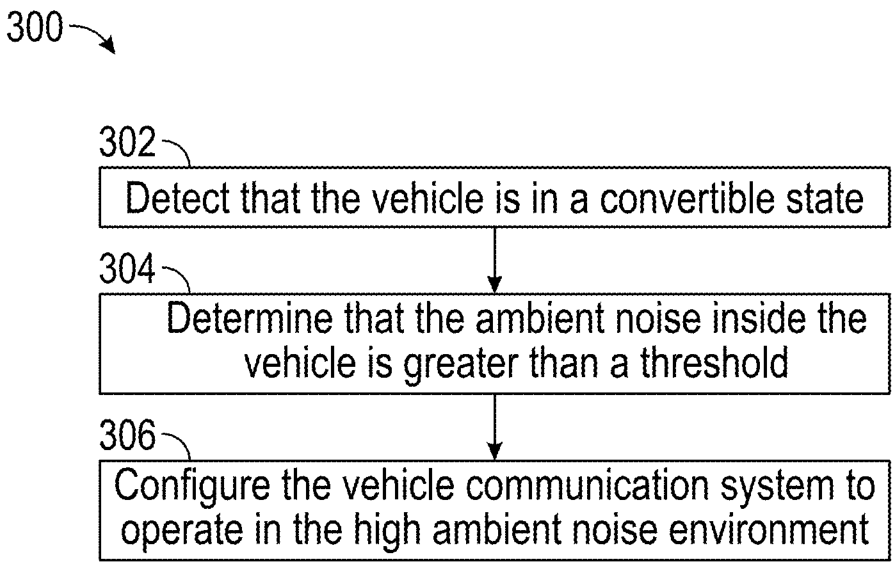
FIG. 3 illustrates a high-level flow chart of a process according to an embodiment of the present disclosure.

FIG. 3 illustrates a high-level flow diagram of a process 300 according to an embodiment of the present disclosure. The process 300 may be performed (e.g., solely by the vehicle 102 or the vehicle 102 in conjunction with the server 104). At step 302, the vehicle may determine whether it is in a convertible state. As noted above, a "convertible state" may mean that a top of the vehicle is fully or partially retracted, one or more doors of the vehicle are removed, one or more top panels of the vehicle, or a sunroof of the vehicle is partially or fully open. The determination that the vehicle is in the convertible state can be made in several ways. The vehicle may use one or more of its sensors of its sensory system 232, such as cameras to capture images and/or video to determine whether the top is fully or partially retracted or whether one or more doors of the vehicle have been removed, etc. In some embodiments, a removable panel or the top of the vehicle may have an associated sensor coupled to it such that whenever that panel is removed or the top is retracted from its normal location, the sensor sends a signal (e.g., to the VCU 210), indicating that the panel has been removed or the top is retracted. In some embodiments, the user may simply lower the windows of the vehicle. The vehicle may detect opening of the windows using the sensors associated with the windows and based on that determine that the vehicle is in the convertible state. In other embodiments, the vehicle operational and status data is available over the Controller Area Network (CAN) bus of the vehicle. In this instance, the determination of whether the vehicle is in a convertible state can be made based on the data available over the CAN bus.

At step 302, the vehicle may determine whether the ambient noise level inside the passenger cabin of the vehicle is above a threshold so as to interfere with normal operation of the communication system(s) of the vehicle. For example, if the top of the vehicle is in a retracted state, the road noise coming from the operation of the vehicle on a road will likely increase as heard in the passenger cabin. Further, noise generated by other vehicles on the road is more likely to be heard in the passenger cabin since the top is retracted/removed. All this and other events may result in a high ambient noise in the passenger cabin. Modern vehicles have a plurality of microphones, accelerometers, and vibration sensors placed around the chassis and the passenger cabin that capture sound/noise from the engine, tires, wind, and other external sources and user conversation and speech. The vehicle can use these microphones to capture the noise data and compare the noise level to a threshold. The threshold can be a preset value based on the type and operation of the vehicle. The vehicle may process the sound/noise received from all the different sensors to identify and isolate the different noise sources. The vehicle may then determine an overall level of ambient noise and compare that to the threshold value. In some embodiments, the vehicle may also receive noise data from the user device. The user device may capture noise data from within the passenger cabin and provide that information to the vehicle. The vehicle may then augment the data captured by vehicle sensors 232 with the data received from the user device to determine the ambient noise level.

At step 306, the vehicle may configure the communication system to alleviate the effect of the high ambient noise level. For example, the vehicle may increase the output volume for audio from its speakers, increase the sensitivity levels for its microphones to capture audio data, enable noise cancellation, or change the mode of operation of the communication system. In the instance where the vehicle enables the active noise cancellation mode, the vehicle may try to cancel out the ambient noise to ensure that the verbal communication within the passenger cabin is discernable. However, in the instance that the vehicle is not able to cancel the ambient noise, the vehicle may notify the user accordingly and suggest ways to reduce the ambient noise. For example, the vehicle may request the user to roll-up the windows, if applicable, or slow down the speed to below a predetermined value. In some embodiments, the vehicle may also suggest covering one or more microphones of the vehicle with a foam microphone windshield to reduce the effect of wind/noise on the microphones. Once the user has performed one or more of those actions when the vehicle is stationary, the vehicle may re-calculate the ambient noise level within the passenger cabin and check whether the noise level has dropped below the threshold. The notification to the user may be provided via the HMI interface of the vehicle, via the user device, projected via a Heads-Up-Display of the vehicle, etc.

Figure 4:
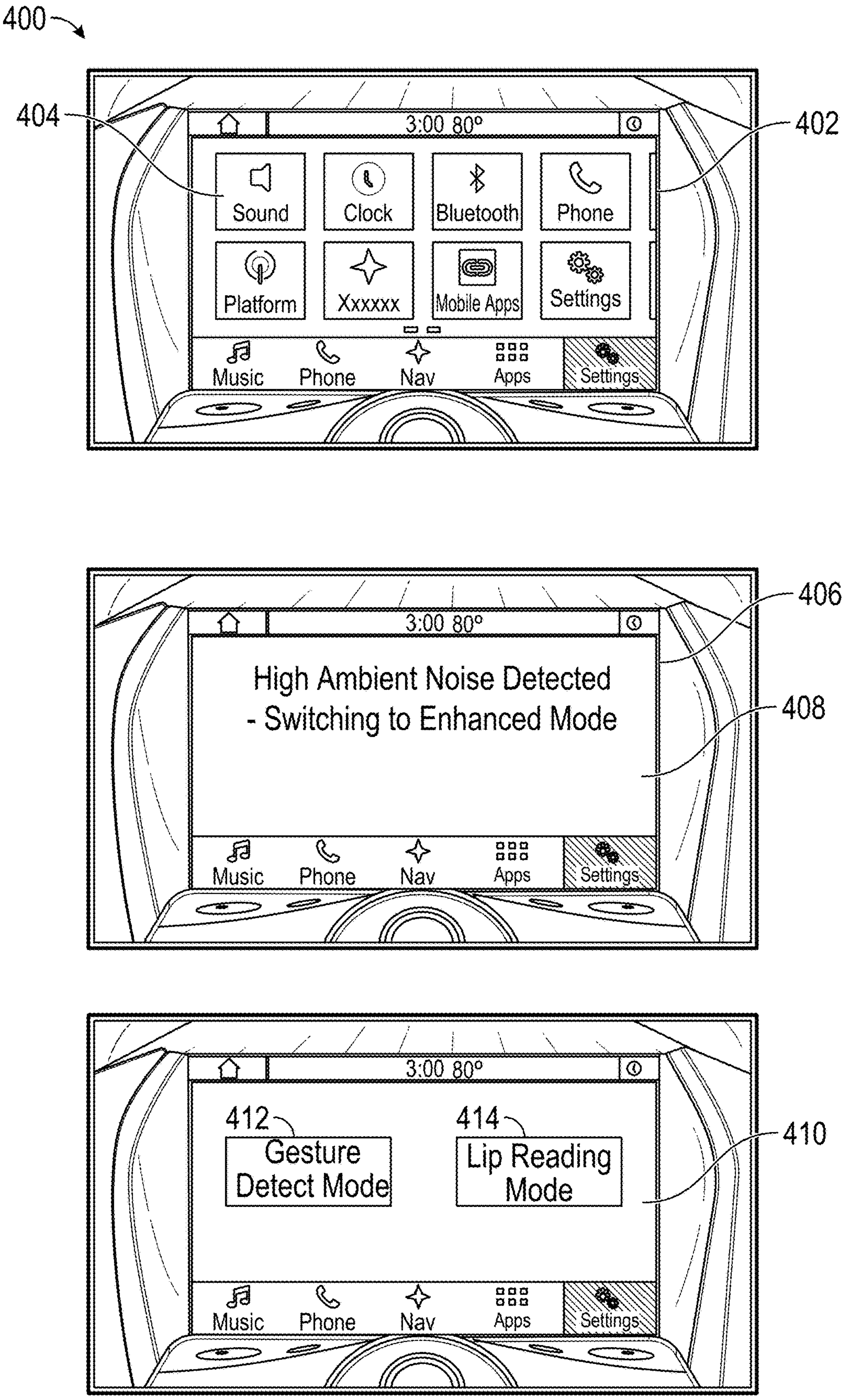
FIG. 4 illustrates sample user interface screens according to an embodiment of the present disclosure.

FIG. 4 illustrates a user interface according to an embodiment of the present disclosure. The user interface 400 may be displayed on an HMI screen of the vehicle. The user interface screen 402 may be the default screen from where various functions of the vehicle may be accessed or controlled. For example, the user interface screen 402 may include one or more control inputs 404 presented in the form of icons. Each control input 404 enables control of or provides access to a specific function of a vehicle. A communication system of the vehicle may include wireless communication between a user device and the vehicle, communication between the user and a navigation system of the vehicle, or communication between the user and a voice-based vehicle control assistant. All of these functions of the vehicle communication system depend on the vehicle being able to accurately capture audio that is either spoken by the user or output by the user device.

In the event that the vehicle determines that the ambient noise level is high enough that it would be difficult to perform one or more of the communication actions properly, the vehicle may switch the communication system to an enhanced mode. The vehicle may inform the user that the enhanced mode is now on by displaying a message 408 on a screen 406 of the user interface 400. Thereafter the vehicle may provide one or more choices for the enhanced mode. Screen 410 illustrates two of the enhanced modes. A first enhanced mode may be a gesture and facial expression detect mode 412, and a second enhanced mode may be a lip reading mode 414. The user may choose one or both of these modes and the vehicle may then operate the communication system based on the selected mode.

The gesture and facial expression detection mode may include use of image sensors and other sensors to detect user gestures and facial expressions to determine whether the user is experiencing difficulty in interacting with the communication system. For example, humans may perform certain gestures such as nodding of the head, shaking of the head, rolling the eyes, etc. in response to verbal communications. In the instance where the user is nodding his/her head, the vehicle may determine that the user is acknowledging a verbal conversation or an audio output via the speakers of the vehicle. The vehicle may then conclude that the current level of audio volume and operating conditions for the communication systems are adequate based on the user gesture and/or facial expressions. On the other hand, if the user shakes his head or appears confused based on his facial expressions, the vehicle may determine that the user is having an issue with the communication system and may take certain actions such as increasing the audio volume or slowing down the pace of the audio output. In some embodiments, if the user is a passenger in the vehicle or if the vehicle is stationary, the vehicle may additionally perform speech to text operation and convert the audio to text and display the text on the user interface. After performing the one or more actions, the vehicle may continue to monitor the gestures and/or facial expressions of the user to ascertain whether the actions performed by the vehicle were useful in improving the quality of the audio communication. In some embodiments, if the vehicle detects that the user is not speaking or that the level of ambient noise is above the threshold, the vehicle may mute or disable one or more microphones of the vehicle to limit the amount of wind noise being transmitted via the microphones. In other embodiments, when the vehicle microphones are muted and the user is in a conversation with another user, the vehicle may generate speech data and/or text data based on the detected gestures and/or facial expressions of the user and transmit that text data or speech data to the other user in the conversation.

The lip reading mode, if enabled, allows the vehicle to determine what the user is speaking even if the speech is not audible or is partially audible. The one or more cameras of the vehicle can capture the movements of the user's lips. Other sensors may capture the gesture data and/or facial expressions as the user is speaking. The captured video and sensor data are processed using machine learning algorithms that are trained on large datasets of lip movements and corresponding speech to learn the patterns and nuances of lip reading. The vehicle may also use acoustic signals to detect facial movements. For example, the vehicle may emit inaudible sound waves and analyze the echoes that bounce back from the user's lip and mouth. The machine learning algorithms can then interpret the lip movements and translate them into text or spoken words. The text or spoken word data can then be used by the vehicle to interpret what the user is saying. The lip reading mode can filter out the ambient noise and focus solely on the lip movements thereby enhancing the performance of the vehicle communication system. In some embodiments, if the user is in conversation with another user via the vehicle communication system and the vehicle detects high ambient noise in the vehicle, the vehicle may mute the microphones of the vehicle and/or the user device and instead generate or synthesize speech data based on the information determined based on the lip reading and/or gesture detection into corresponding text data and/or audio/speech data and transmit that text data and/or audio data to the other party in the conversation.

In some embodiments, the vehicle may use the gesture/facial expression detection feature to conclude that the ambient noise level in the vehicle is high enough to cause issues with the vehicle communication system. In this instance, the vehicle may calculate the ambient noise level if the gesture/facial expression detection indicates that the user is having trouble with the vehicle communication system. Thus, the gesture/facial expression data may be used as a trigger condition to calculate the actual ambient noise levels in the vehicle.

Figure 5:
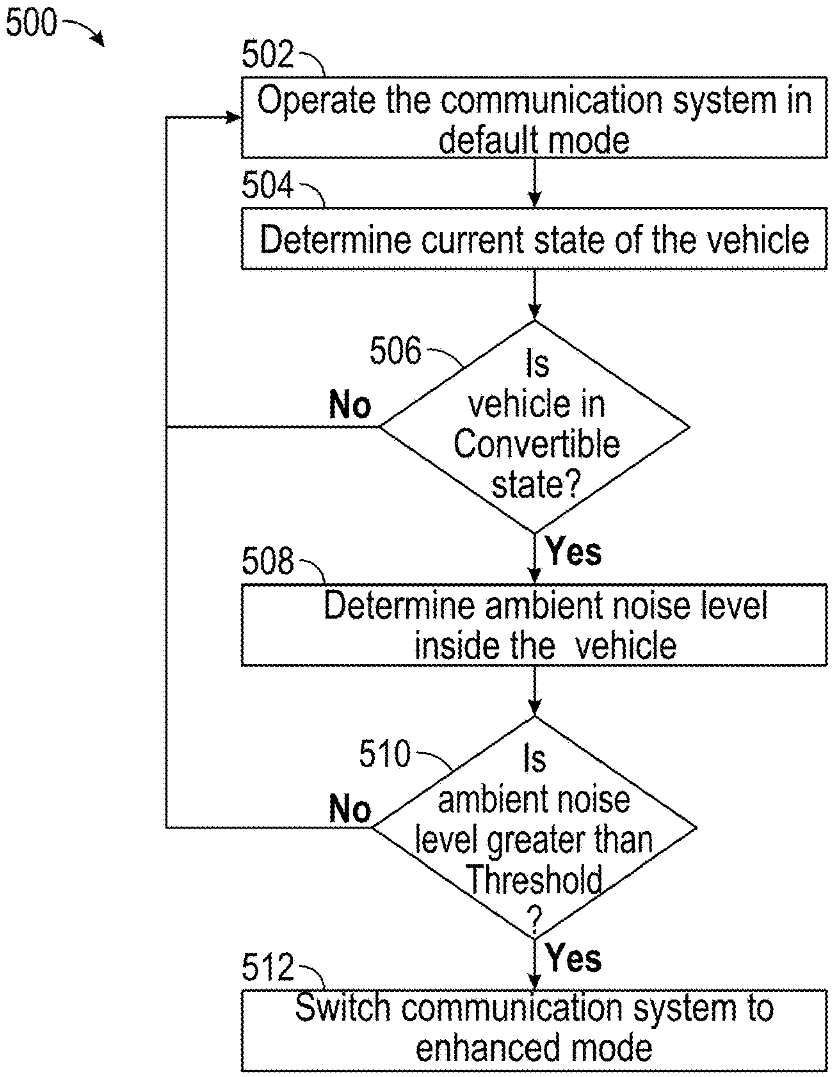
FIG. 5 illustrates a flow chart for a process for operating a communication system of a vehicle according to an embodiment of the present disclosure.

FIG. 5 is a flow diagram of a process 500 according to an embodiment of the present disclosure. Process 500 may be performed (e.g., solely by the vehicle 102 or by the vehicle 102) in conjunction with the server 104. At step 502, the vehicle may operate the communication system in its default mode. The default mode may be set by the vehicle manufacturer or based on user preference. For example, the audio volume may be set to a specific value and/or the sensitivity of the microphones may be set at a default level. At step 504, the vehicle may detect a current state of the vehicle. The current state of the vehicle may include whether the vehicle is stationary or in motion, speed of the vehicle, status of doors, windows and other removable panels of the vehicle, etc. The state of the vehicle may be determined using data available via the CAN bus of the vehicle and/or data captured by one or more sensors of the vehicle.

At step 506, the vehicle may determine whether the vehicle is in a convertible state. As explained above, a convertible state may include one or more of: the vehicle with its top partially or fully retracted, or the vehicle with one or more of its doors removed, or the vehicle with a partially or fully opened sunroof, or the vehicle with one or more of its top panels removed, or vehicles having a high ambient noise levels in the passenger cabin. In an embodiment, the vehicle may use one or more of its sensors to determine whether the vehicle is in the convertible state. If it is determined that the vehicle is not in the convertible state, the process 500 may return to step 502. If at step 506 it is determined that the vehicle is in the convertible state, the vehicle may determine the level of ambient noise in the vehicle at step 508. For example, the vehicle may gather audio and/or noise data using the various sensors of the vehicle and calculate the ambient noise level based on that data. At step 510, the vehicle compares the calculated ambient noise level with a threshold value. The threshold value may represent a maximum level of ambient noise level in which the communication system of the vehicle may operate satisfactorily. If the vehicle determines at step 510 that the ambient noise level is lower than the threshold, the process 500 may return to step 502. For example, this can happen if the vehicle is in a convertible state but parked in a quiet location while the user is talking to someone via the car communication system. In this instance, there may not be any need to modify the operation of the communication system.

However, if the vehicle determines at step 510 that the ambient noise level is above the threshold, the vehicle may switch the communication system to an enhanced mode at step 512. For example, the enhanced mode may include enabling the lip reading mode, and/or increasing the audio output volume, and/or enabling the gesture detection mode, etc.

Figure 6:
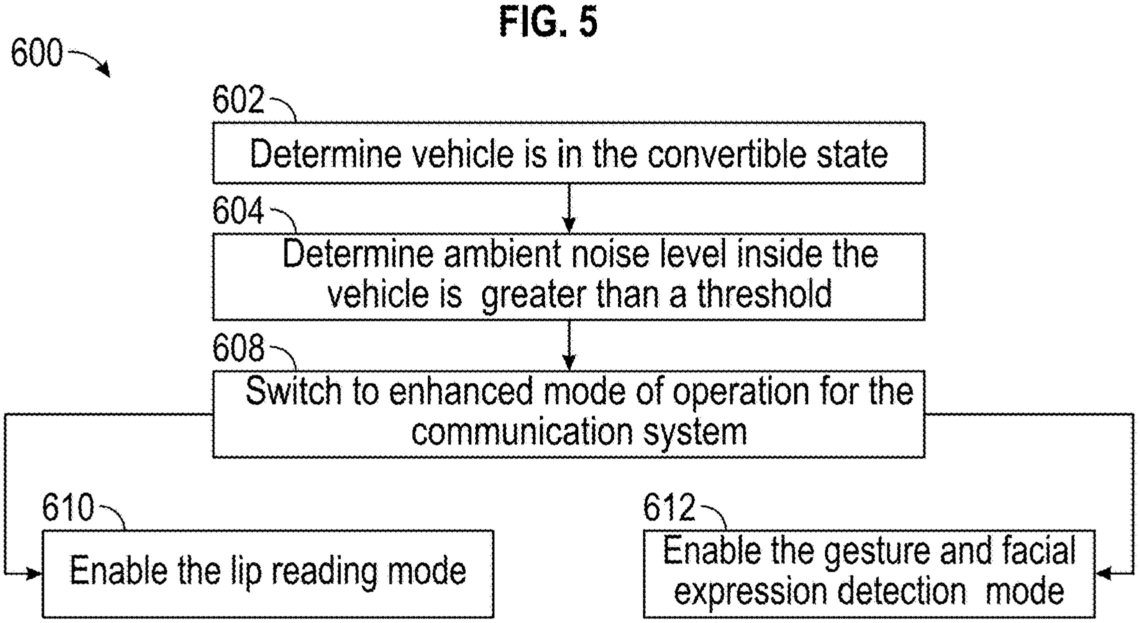
FIG. 6 illustrates a flow chart for a process for operating a communication system of a vehicle according to another embodiment of the present disclosure.

FIG. 6 is a flow diagram for a process 600 according to another embodiment of the present disclosure. Process 600 may be performed (e.g., solely by the vehicle 102 or by the vehicle 102) in conjunction with the server 104. At step 602, the vehicle may determine that it is in a convertible state (e.g., using any of the techniques described above). Once the vehicle determines that it is in the convertible state, the vehicle may then determine the ambient noise level in the vehicle at step 604 and also determine that the ambient noise level is greater than a threshold. Subsequently, the vehicle may switch to an enhanced mode of operation for the communication system of the vehicle (e.g., as described above) at step 608. As part of switching to the enhanced mode of operation, the vehicle may enable the lip reading mode at step 610 and/or enable the gesture and facial expression detection mode at step 612. The vehicle may then operate the communication system in the enhanced mode until it determines that the ambient noise level has fallen below or is at the threshold value. In some embodiments, the vehicle may enable the gesture and facial detection mode after it determines it is in the convertible state and prior to determining the ambient noise level. In other words, the vehicle may use the gesture and facial detection data as a precursor or at trigger condition before deciding whether to calculate the ambient noise level.

In some embodiments, the commands/instructions used by the communication system can be translated to gestures and/or facial expressions. For example, frequently used commands like "play", "stop", "destination home", etc. can be assigned a specific gesture and/or facial expression by the user. The vehicle may record the gesture/facial expression and store that information in the vehicle database. If the vehicle determines that the ambient noise level in the vehicle is high enough to cause issues with the normal operation of the communication system, the vehicle may automatically switch to the enhanced mode of using gestures and/or facial expressions instead of using speech input or suggest to the user that it may be beneficial to switch to the enhanced mode. Thereafter, the user may use gestures and/or facial expressions to control the various features of the communication system and/or the vehicle generally.

Figure 7:
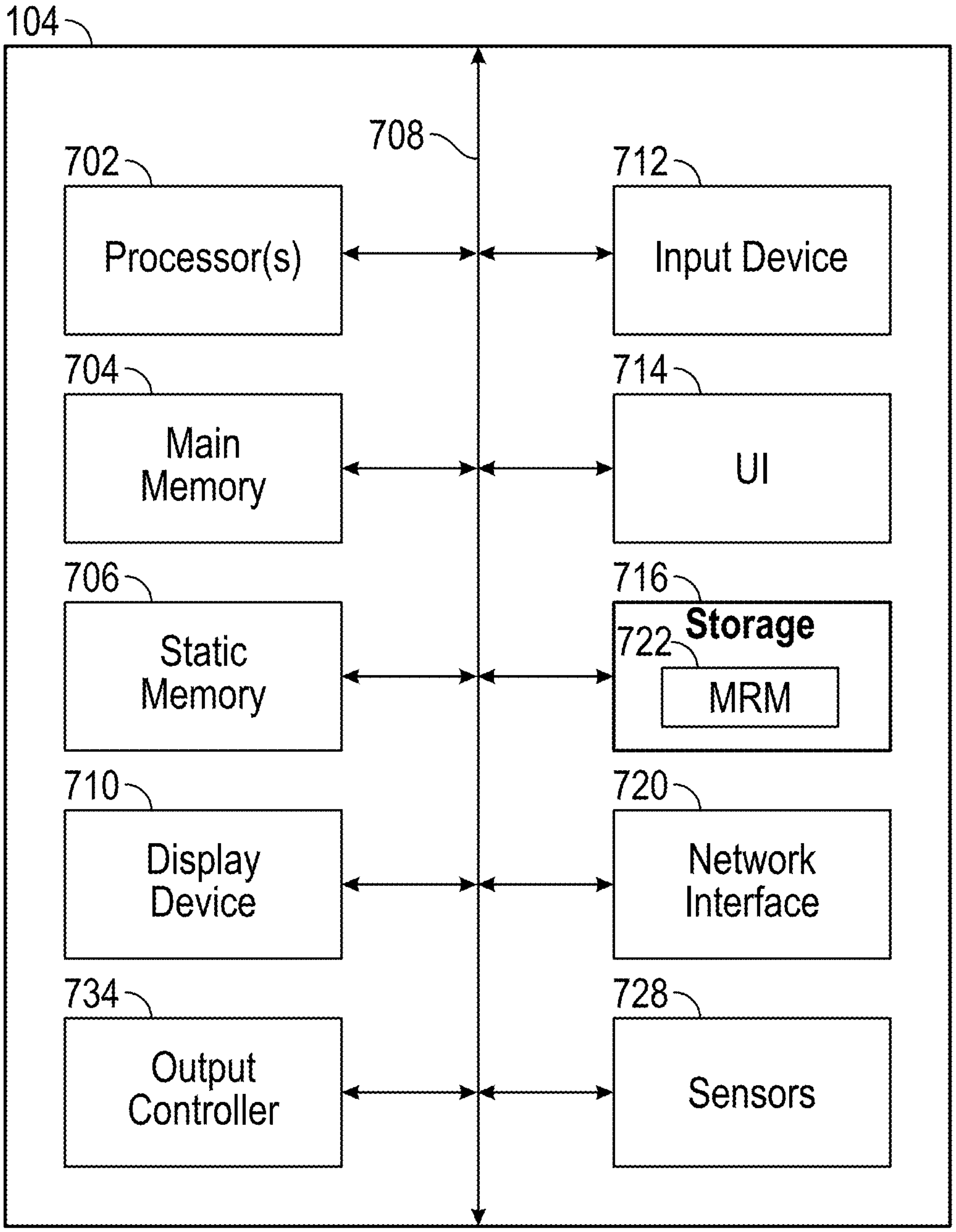
FIG. 7 illustrates a block diagram of a server according to an embodiment of the present disclosure.

FIG. 7 depicts a block diagram of the example control server 104 upon which any of one or more techniques (e.g., methods) may be performed, in accordance with one or more example embodiments of the present disclosure. In other embodiments, the server 104 may operate as a standalone device or may be connected (e.g., networked) to other servers. In a networked deployment, the server 104 may operate in the capacity of a server machine, a client machine, or both in server-client network environments. In an example, the server 104 may act as a peer server in peer-to-peer (P2P) (or other distributed) network environments. The server 104 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 104 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The server 104 may further include a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The server 104 may additionally include a storage device (i.e., drive unit) 716, a network interface device/transceiver 720 coupled to antenna(s), and one or more sensors 728, such as a global positioning system (GPS) sensor, a compass, an accelerometer, or other sensor. The server 104 may include an output controller 734, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the server 104. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the server 104 and that cause the server 104 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 104 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner based on recommendations or notifications provided by the vehicle should comply with all the rules specific to the location and operation of the vehicle (e.g., Federal, state, country, city, etc.). The recommendation or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

one or more sensors;

one or more processors coupled to the one or more sensors; and a communication system coupled to the one or more processors;

wherein the one or more processors are configured to:

receive sensor data from the one or more sensors;

determine, based on the sensor data, that the vehicle is in a convertible state;

determine a level of ambient noise in the vehicle;

determine that the level of ambient noise is greater than a threshold; and configure the communication system to operate in an enhanced mode, wherein prior to determining the level of ambient noise, the one or more processors are further configured to:

detect a gesture or facial expression of a user in the vehicle; and determine, based on the gesture or facial expression, that the user is having difficulty interacting with the communication system.

2. The vehicle of claim 1, wherein in the convertible state:

a top of the vehicle is at least partially retracted; or at least one top panel of the vehicle is removed; or at least one door of the vehicle is removed; or a sunroof of the vehicle is at least partially opened.

3. The vehicle of claim 1, wherein the one or more sensors include one or more of: a camera, an accelerometer, a microphone, or a vibration sensor and wherein the one or more processors are configured to:

determine that a user of the vehicle is engaged in a conversation with another user via the communication system;

mute the microphone;

detect a gesture performed by the user;

generate speech data corresponding to the gesture; and transmit the speech data to the other user via the communication system.

4. The vehicle of claim 1, wherein to configure the communication system to operate in the enhanced mode, the one or more processors are further configured to enable a lip reading mode of the communication system.

5. The vehicle of claim 1, wherein to configure the communication system to operate in the enhanced mode, the one or more processors are further configured to enable a gesture and facial expression detection mode of the communication system.

6. The vehicle of claim 1, wherein the one or more processors are further configured to:

present a user interface displaying one or more control inputs associated with the enhanced mode; and receive user input selecting one of the one or more control inputs.

7. The vehicle of claim 6, wherein the one or more control inputs include a lip reading control input and a gesture and facial detection control input.

8. A method comprising:

determining, by a vehicle using one or more sensors of the vehicle, that the vehicle is in a convertible state;

determining, by the vehicle using the one or more sensors, an ambient noise level in the vehicle;

determining, by the vehicle, that the ambient noise level is greater than a threshold; and switching, by the vehicle, a communication system of the vehicle from a first mode of operation to a second mode of operation, wherein prior to determining the ambient noise level, the method further comprises:

detecting, by the vehicle, a gesture or facial expression of a user in the vehicle; and determining, by the vehicle and based on the gesture or facial expression, that the user is having difficulty interacting with the communication system.

9. The method of claim 8, further comprising:

presenting, by the vehicle on a user interface of the vehicle, one or more control inputs associated with the second mode; and receiving, by the vehicle, user input selecting one of the one or more control inputs.

10. The method of claim 9, wherein the one or more control inputs include a lip reading control input and a gesture and facial detection control input.

11. The method of claim 8, wherein the second mode includes a lip reading mode of the communication system.

12. The method of claim 8, wherein the second mode includes a gesture detection mode of the communication system.

13. The method of claim 8, wherein the convertible state includes one or more of:

a top of the vehicle is at least partially retracted;

at least one top panel of the vehicle is removed;

at least one door of the vehicle is removed; or a sunroof of the vehicle is at least partially opened.

14. A method comprising:

storing, by a vehicle in a database, association information between each of a plurality of gestures and a corresponding verbal command associated with the vehicle;

determining, by the vehicle using one or more sensors of the vehicle, that the vehicle is in a convertible state;

determining, by the vehicle, that an ambient noise level in the vehicle is higher than a threshold; and instructing, by the vehicle to a user of the vehicle, based on the vehicle being in the convertible state and the ambient noise level being higher than the threshold, to use gestures instead of verbal commands to interact with the vehicle wherein prior to determining the ambient noise level, the method further comprises:

detecting, by the vehicle, a gesture or facial expression of a user in the vehicle; and determining, by the vehicle and based on the gesture or facial expression, that the user is having difficulty interacting with the communication system.

15. The method of claim 14, further comprising:

detecting, by the vehicle, a gesture performed by the user;

determining, by the vehicle and based on the database, a command corresponding to the gesture;

determining, by the vehicle, an action corresponding to the command; and executing, by the vehicle, the action.

16. The method of claim 14, wherein the convertible state includes one or more of:

a top of the vehicle is at least partially retracted;

at least one top panel of the vehicle is removed;

at least one door of the vehicle is removed; or a sunroof of the vehicle is at least partially opened.

17. The method of claim 14, wherein the one or more sensors include one or more cameras, and determining that the vehicle is in the convertible state further comprises:

receiving image data from the one or more cameras of the vehicle; and determining, based on the image data, that the vehicle is in the convertible state.

18. The method of claim 14, further comprising:

storing, by the vehicle in the database, correlation information between each of a plurality of facial expressions and a corresponding verbal command associated with the vehicle;

detecting, by the vehicle, a facial expression of the user; and executing a verbal command associated with the facial expression.

* * * * *